US010989520B2

(12) United States Patent
Oh et al.

(10) Patent No.: US 10,989,520 B2
(45) Date of Patent: Apr. 27, 2021

(54) METHODS FOR NONDESTRUCTIVE MEASUREMENTS OF THICKNESS OF UNDERLYING LAYERS

(71) Applicant: Samsung Electronics Co., Ltd., Suwon-si (KR)

(72) Inventors: Duck-mahn Oh, Suwon-si (KR); Jong-an Kim, Seongnam-si (KR); Si-hyeon Choi, Hwaseong-si (KR); Young-hoon Sohn, Incheon (KR); Yu-sin Yang, Seoul (KR); Chi-hoon Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/715,258

(22) Filed: Dec. 16, 2019

(65) Prior Publication Data

US 2020/0208964 A1 Jul. 2, 2020

(30) Foreign Application Priority Data

Dec. 27, 2018 (KR) ........................ 10-2018-0171137

(51) Int. Cl.
*G01B 11/06* (2006.01)
(52) U.S. Cl.
CPC ...... *G01B 11/0666* (2013.01); *G01B 11/0625* (2013.01)
(58) Field of Classification Search
CPC ............ G01B 11/0625; G01B 11/0666; G01B 17/02; G01J 2003/425
USPC ................................................ 356/600–640
See application file for complete search history.

(56) References Cited

U.S. PATENT DOCUMENTS

| 5,748,318 A | 5/1998 | Maris et al. |
| 6,504,618 B2 | 1/2003 | Morath et al. |
| 6,800,852 B2 | 10/2004 | Larson et al. |
| 6,879,051 B1 | 4/2005 | Singh et al. |
| 7,050,178 B2 | 5/2006 | Morath et al. |
| 7,197,426 B2 | 3/2007 | Park et al. |
| 8,312,772 B2 | 11/2012 | Tas et al. |

(Continued)

FOREIGN PATENT DOCUMENTS

| JP | H1-1145231 A | 5/1999 |
| JP | 2007-147620 A | 6/2007 |
| KR | 10-1794716 B1 | 11/2017 |

*Primary Examiner* — Tri T Ton
(74) *Attorney, Agent, or Firm* — Harness, Dickey & Pierce, P.L.C.

(57) ABSTRACT

A method for nondestructive measurement of an underlying layer thickness includes irradiating, with a pump laser pulse, a sample to induce generation of an acoustic wave in the sample such that the acoustic wave propagates through the sample over time, where the sample includes a substrate, an underlying layer on the substrate, and an overlying layer on the underlying layer and the underlying layer is isolated from an exterior of the sample by at least the overlying layer, irradiating the sample with a probe laser pulse after irradiating the sample with the pump laser pulse, determining a reflectance variation of the sample over time, based on monitoring a variation of a reflection of the probe laser pulse from the sample over time, to generate a first graph showing a variation of reflectance of the sample over time, and determining a thickness of the underlying layer based on the first graph.

17 Claims, 12 Drawing Sheets

(56) References Cited

U.S. PATENT DOCUMENTS

| | | |
|---|---|---|
| 8,537,363 B2 | 9/2013 | Maris |
| 9,032,801 B2* | 5/2015 | Koch .................... G01B 17/02 |
| | | 73/627 |
| 10,008,424 B2 | 6/2018 | Wimplinger |
| 2003/0084725 A1 | 5/2003 | Mignogna et al. |
| 2003/0112451 A1* | 6/2003 | Mautz .................... B24B 49/04 |
| | | 356/630 |

* cited by examiner

METHODS FOR NONDESTRUCTIVE MEASUREMENTS OF THICKNESS OF UNDERLYING LAYERS

CROSS-REFERENCE TO RELATED APPLICATION

This application claims priority under 35 U.S.C. § 119 to Korean Patent Application No. 10-2018-0171137 filed on Dec. 27, 2018 in the Korean Intellectual Property Office, the disclosure of which is hereby incorporated by reference in its entirety.

TECHNICAL FIELD

Example embodiments of the present disclosure relate to methods for nondestructive measurements of a thickness of underlying layers, and, more specifically, to methods for measuring a thickness of underlying layers based on picoseconds ultrasonic measurement methods.

DISCUSSION OF RELATED ART

Picoseconds ultrasonic measurement is a type of nondestructive measurement method. Picoseconds ultrasonic measurement methods include generating an ultrasonic wave in a thin layer on a substrate based on using a laser pulse. The ultrasonic wave may change an optical property, including reflectance, for example, of the thin layer. It has been known that a thickness of the thin layer can be measured based on monitoring a variation in the optical property of the thin layer.

SUMMARY

According to some example embodiments of the inventive concepts, a method may include irradiating a sample with a pump laser pulse to induce generation of an acoustic wave in the sample such that the acoustic wave propagates through the sample over time, the sample including a substrate, an underlying layer on the substrate, and an overlying layer on the underlying layer, the underlying layer isolated from an exterior of the sample by at least the overlying layer. The method may include irradiating the sample with a probe laser pulse subsequent to irradiating the sample with the pump laser pulse. The method may include determining a reflectance variation of the sample over time, based on monitoring a variation of a reflection of the probe laser pulse from the sample over time, to generate a first graph showing a variation of reflectance of the sample over time, and determining a thickness of the underlying layer based on the first graph.

According to some example embodiments of the inventive concepts, a method may include irradiating a sample with a pump laser pulse to induce generation of an acoustic wave in the sample such that the acoustic wave propagates through the sample over time, the sample including a substrate, an underlying layer on the substrate, an overlying layer on the underlying layer, the underlying layer isolated from an exterior of the sample by at least the overlying layer. The method may include irradiating the sample with a probe laser pulse subsequent to irradiating the sample with the pump laser pulse. The method may include determining a reflectance variation of the sample over time, based on monitoring a variation of a reflection of the probe laser pulse from the sample over time, to generate an initial graph showing a variation of reflectance of the sample over time. The method may include controlling the pump laser pulse and the probe laser pulse based on the initial graph to irradiate the sample with the controlled pump laser pulse and irradiate the sample with the controlled probe laser pulse. The method may include determining the reflectance variation of the sample over time, based on monitoring a variation of a reflection of the controlled probe laser pulse from the sample over time, to generate a final graph showing a variation of reflectance of the sample over time based on the controlling. The method may include determining a thickness of the underlying layer based on the final graph.

According to some example embodiments of the inventive concepts, a method may include generating an acoustic wave in a sample including a substrate, an underlying layer on the substrate, and an overlying layer on the underlying layer, the underlying layer isolated from an exterior of the sample by at least the overlying layer. The method may include generating a first graph showing a reflectance variation of the sample as a function of time during propagation of the acoustic wave in the sample. The method may include determining a thickness of the underlying layer based on the first graph.

DETAILED DESCRIPTION OF THE EMBODIMENTS

Various example embodiments will now be described more fully with reference to the accompanying drawings in which some example embodiments are shown. However, the inventive concepts may be embodied in many alternate forms and should not be construed as limited to only example embodiments set forth herein.

Figure 1:
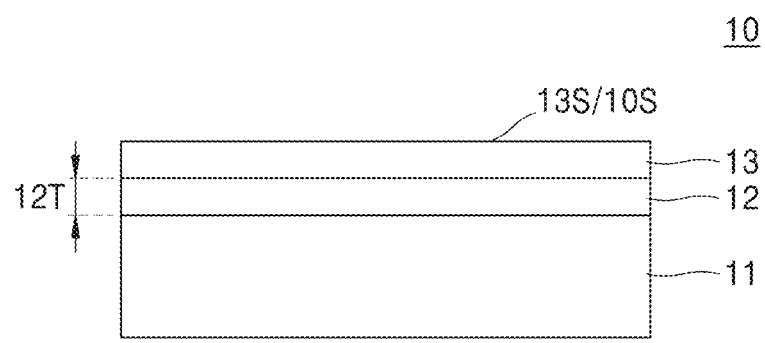
FIG. 1 is a cross-sectional view illustrating a sample that is a measurement object of a method according to some example embodiments of the inventive concepts.

FIG. 1 is a cross-sectional view illustrating a sample that is a measurement object of a method according to some example embodiments of the inventive concepts.

Referring to FIG. 1, a sample 10 may include a substrate 11, an underlying layer 12 on the substrate 11, and an overlying layer 13 on the underlying layer 12. Accordingly, it will be understood that the underlying layer 12 may be a layer that is obscured and/or isolated from exposure to an exterior of the sample 10 by at least the overlying layer 13. The substrate 11 may include an arbitrary material. For example, the substrate 11 may include polymer, ceramic, glass, semiconductor, or a combination thereof, but is not limited thereto. In some example embodiments, the substrate 11 may include a group IV semiconductor material, a group III-V compound semiconductor material, or a group II-VI compound semiconductor material. The IV semiconductor material may include, for example, silicon (Si), germanium (Ge), or silicon-germanium (SiGe). The III-V compound semiconductor material may include, for example, gallium arsenide (GaAs), indium phosphide (InP), gallium phosphide (GaP), Indium arsenide (InAs), Indium antimony (InSb), or Indium gallium arsenide (InGaAs). The group II-VI compound semiconductor material may include, for example, zinc telluride (ZnTe), or cadmium sulfide (CdS).

The overlying layer 13 may include an arbitrary material and have an arbitrary thickness. In some example embodiments, the overlying layer 13 may include a metal. For example, the overlying layer 13 may include aluminum (Al), tungsten (W), copper (Cu), silver (Ag), gold (Au), but is not limited thereto.

The underlying layer 12 may be disposed between the overlying layer 13 and the substrate 11. The underlying layer 12 may include an arbitrary material and have an arbitrary thickness 12T, which as shown may be a thickness in a direction that is perpendicular to a surface 13S of the overlying layer and/or an incident surface 10S of the sample 10. In some example embodiments, the underlying layer 12 may be formed of the same material as the overlying layer 13 but may be a seed layer having a different density. In some example embodiments, the underlying layer 12 may be formed of a different material form the overlying layer 13. In some example embodiments the underlying layer 12 may be a material formed by reaction of the overlying layer 13 and the substrate 11. For example, the underlying layer 12 may be a silicide layer formed by reaction of metal and silicon. The underlying layer 12 may include a metal, a metal nitride, or a silicide, but is not limited thereto.

Figure 2:
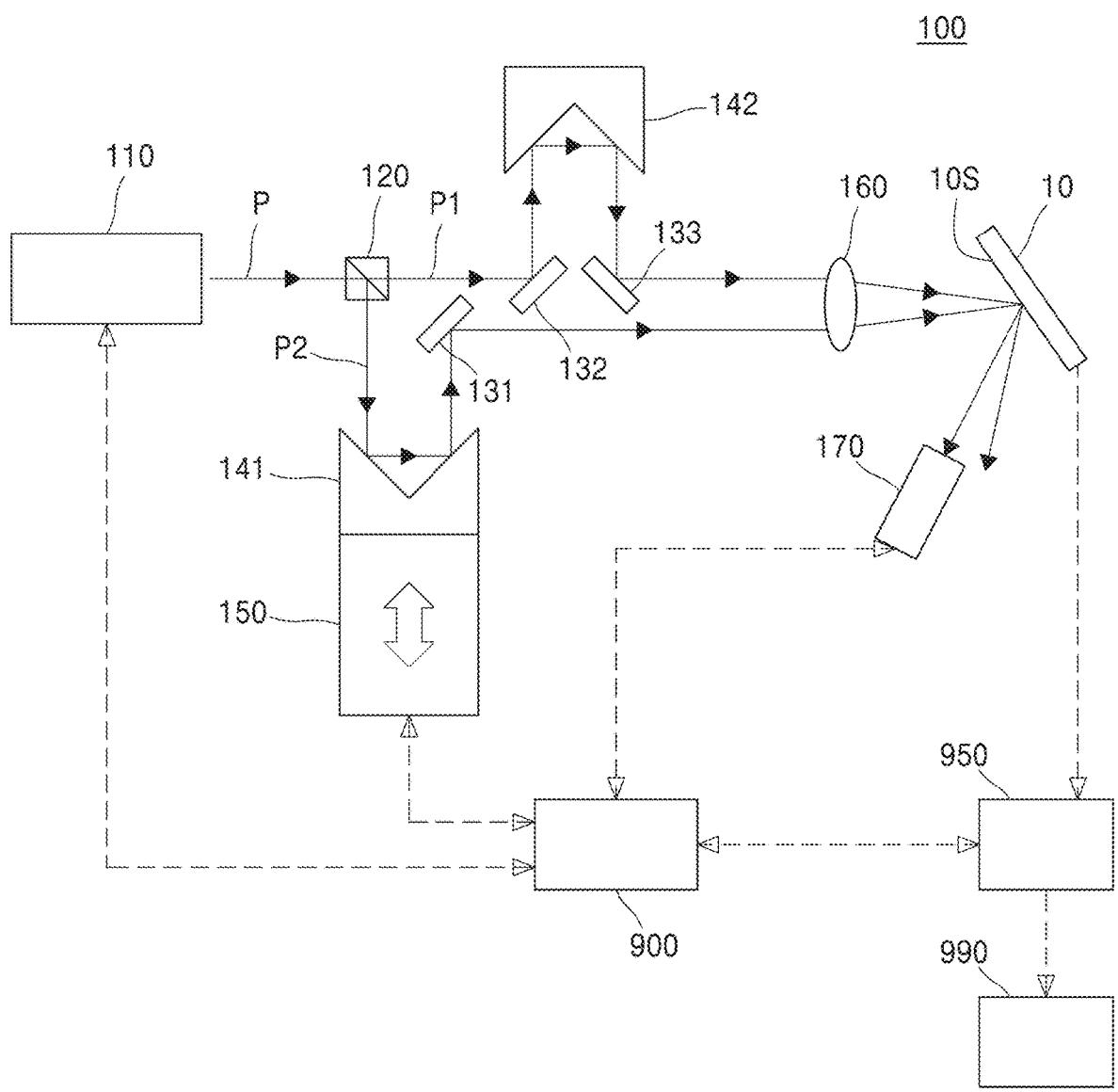
FIG. 2 is a schematic view illustrating a measurement apparatus used for a method according to some example embodiments of the inventive concepts.

FIG. 2 is a schematic view illustrating a measurement apparatus used for a method according to some example embodiments of the inventive concepts.

Referring to FIG. 2, a measurement apparatus 100 may be a picoseconds ultrasonic measurement apparatus. For example, the measurement apparatus 100 may include a pulsed laser 110, a beam splitter 120, a delay stage 150, a plurality of retroreflectors 141 and 142, a plurality of mirrors 131, 132, and 133, a lens 160, and a photo detector 170.

The pulsed laser 110 may emit a laser beam P. The laser beam P may have any repetition rate, any pulse duration, and any wavelength. For example, the pulsed laser 110 may be a titanium-sapphire laser emitting the laser beam P having the repetition rate of about 10 MHz to 100 MHz, the pulse duration of about 100 fs to 1 ps, and the wavelength of about 400 nm to 800 nm, but is not limited thereto.

The laser beam P may be split into a pump laser beam P1 and a probe laser beam P2. Thereafter, the pump laser beam P1 and the probe laser beam P2 may pass through paths with different lengths and may be incident on the sample 10 (e.g., incident on an incident surface 10S of the sample), such that a probe laser pulse of the probe laser beam P2 arrives at the sample later than a pump laser pulse of the pump laser beam P1. The pump laser beam P1 may be sequentially reflected by a first pump mirror 132, a pump retroreflector 142, and a second pump mirror 133 and may pass through the lens 160, thus being incident on the sample 10. The probe laser beam P1 may be sequentially by a probe retroreflector 141 and a probe mirror 131 and may pass through the lens 160, thus being incident on the sample 10. The length of the path along which the pump laser beam P1 moves may be fixed, whereas the length of the path along which the probe laser beam P2 moves may be adjusted by the delay stage 150. Thus, the sample 10 may be irradiated with a probe laser pulse of the probe laser beam P2 subsequent to being irradiated with a pump laser pulse of the pump laser beam P1, and a time difference between when the pump laser pulse of the pump laser beam P1 arrives at the sample and when the probe laser pulse of the probe laser beam P2 arrives at the sample may be adjusted.

Parts of the pump laser beam P1 and the probe laser beam P2 incident on an incident surface 10S of the sample 10 may be reflected from the incident surface 10S. The incident surface 10S may be, for example, a surface 13S of the overlying layer 13 that is exposed to an exterior of the sample 10 and is distal to the underlying layer 12. The reflected probe laser beam P2 may be detected by a photo detector 170. A reflectance variation of the sample 10 may be measured from the detected reflected probe laser beam P2 by the photo detector 170. The pump laser beam P1 may generate an acoustic wave (e.g., ultrasonic wave) in the sample 10. As the acoustic wave is propagated in the sample 10 over time, the reflectance of the sample 10 for the probe laser beam P2 may be varied over time. Thus, a graph shown in FIG. 3 may be obtained by measuring the reflectance variation of the sample 10 over time during the propagation of the acoustic wave in the sample 10 over time. Restated, a variation of the reflectance of the sample 10 over time may be measured and/or monitored, based on measuring and/or monitoring variation of a reflection of the probe laser pulse of the probe laser beam P2 from the incident surface 10S of the sample 10 over time, to obtain ("generate") a first graph, such as the graph shown in FIG. 3, showing the variation of reflectance of the sample 10 (also referred to herein as the reflectance variation) over time.

Still referring to FIG. 2, the measurement apparatus 100 may further include a manufacturing assembly 950 that includes one or more devices that are configured to manufacture an electronic device 990, which may include a semiconductor device, based on the sample 10, wherein the manufacturing may include incorporating the sample 10 into at least a portion of the electronic device 990. Still referring to FIG. 2, the measurement apparatus 100 may further include a computing device 900 that is communicatively coupled to the pulsed laser 110, the delay stage 150, the photo detector 170, and/or the manufacturing assembly 950. The computing device 900 may include a memory (e.g., a storage device) that stores a program of instructions and a processor (e.g., an instance of processing circuitry) that is configured to execute the stored program of instructions to perform one or more steps of one or more methods, and such performing may include controlling the pulsed laser 110, the delay stage 150, the photo detector 170, and/or the manufacturing assembly 950.

Figure 3:
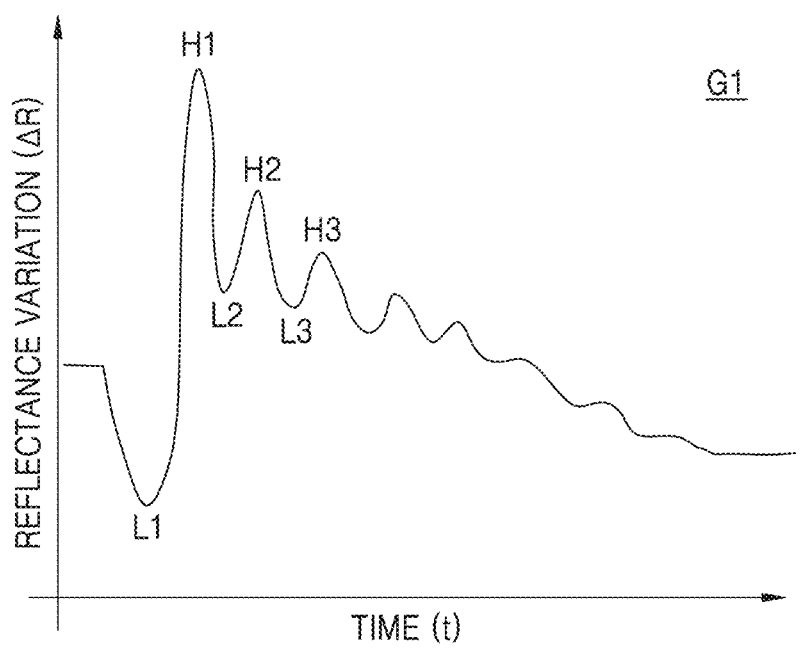
FIG. 3 is a graph of time versus reflectance variation obtained by a method according to some example embodiments of the inventive concepts.

FIG. 3 is a graph of time versus reflectance variation obtained by a method according to some example embodiments of the inventive concepts.

Reference to FIG. 3, a first graph G1 may be an instance of raw data that records a reflectance variation depending on time (also referred to herein as a variation of reflectance of the sample 10 over time). The first graph G1 may have a plurality of lowest points (e.g., L1, L2, L3) and a plurality of highest points (e.g., H1, H2, H3). In FIG. 3, three lowest points and three highest points are illustrated, but the number ("quantity") of the lowest points and the highest points of the first graph G1 is not limited thereto. In the vicinity of each lowest point, the reflectance variation may be reduced before arriving at each lowest point and may increase after arriving at each lowest point. Thus, each lowest point may have locally a minimum reflectance variation. In the vicinity of each highest point, the reflectance variation may increase before arriving at each highest point and may reduce after arriving at each highest point. Thus, each highest point may have locally maximum reflectance variation. The plurality of lowest points and the plurality of highest points may alternately appear. For example, a first lowest point L1, a first highest point H1, a second lowest point L2, a second highest point H2, a third lowest point L3, and a third highest point H3 may sequentially appear.

Figure 4:
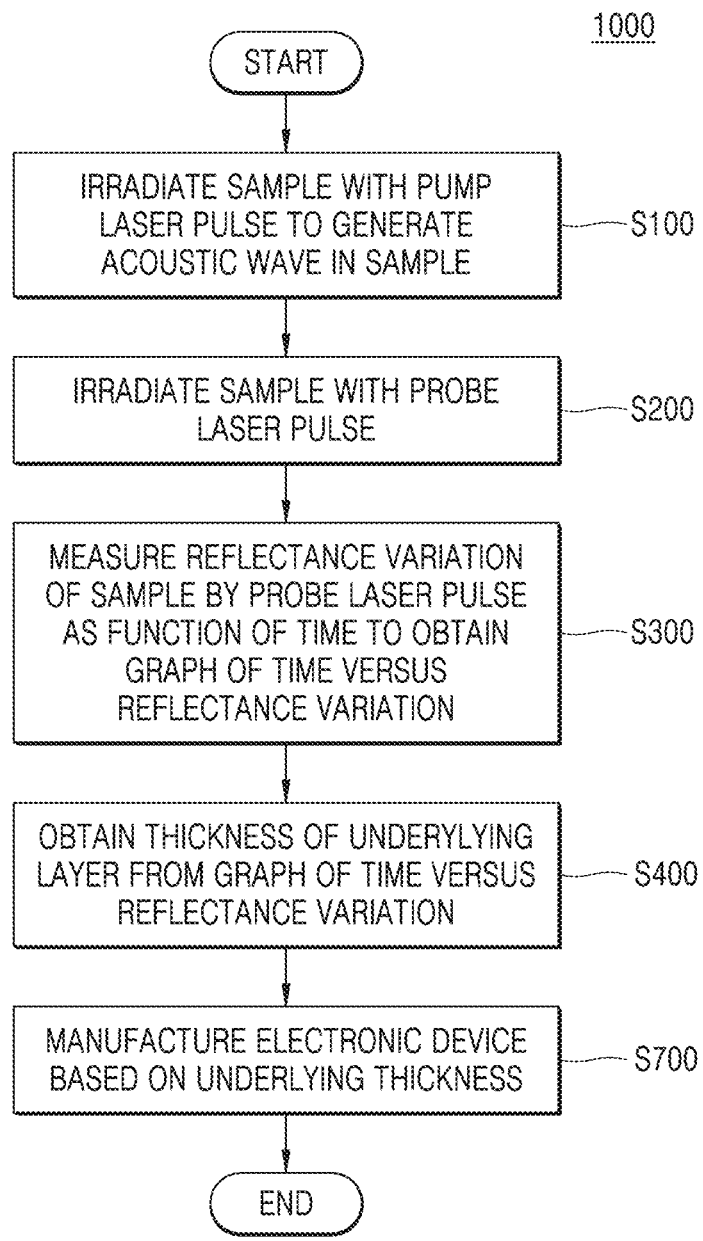
FIG. 4 is a flow chart of a method according to some example embodiments of the inventive concepts.

FIG. 4 is a flow chart of a method 1000 according to some example embodiments of the inventive concepts. The method 1000 may be performed, partially or entirely, by the computing device 900.

Referring to FIG. 4, a method 1000 for nondestructive measurement of a thickness of an underlying layer according to some example embodiments may include a step S100 of irradiating a sample (e.g., irradiating an incident surface of the sample) with a pump laser pulse to generate ("induce generation of") an acoustic wave in the sample such that the acoustic wave propagates through the sample over time, a step S200 of irradiating the sample (e.g., irradiating the incident surface of the sample) with a probe laser pulse subsequent to irradiating the sample with the pump laser pulse, a step S300 of measuring ("determining") a reflectance variation of the sample by the probe laser pulse as a function of time (e.g., a variation of reflectance of the sample over time, as indicated by variation of reflection of the probe laser pulse from the incident surface of the sample over time) during propagation of the acoustic wave in the sample 10 to obtain a graph of time versus reflectance variation (e.g., a graph showing the variation of reflectance of the sample over time), and a step S400 of obtaining ("determining") a thickness of an underlying layer of the sample (e.g., layer 12 of sample 10) from the graph of time versus reflectance variation that is obtained at step S300. The method 1000 may further include a step S700 of controlling the manufacturing assembly 950 to selectively manufacture an electronic device 990 that includes the sample 10 based upon a determination of whether the determined underlying thickness at least meets a threshold thickness magnitude. The steps of method 1000 may be partially or entirely controlled and/or implemented by a computer device 900 that is communicatively coupled to the pulsed laser 110, the delay stage 150, the photo detector 170, and/or the manufacturing assembly 950. For example, in response to a determination that the determined thickness does not at least meet the threshold, the sample 10 may be discarded. In another example, in response to a determination that the determined thickness does at least meet the threshold, the sample 10 may be selectively forwarded to the manufacturing assembly 950 and incorporated into a manufactured electronic device 990. Because the sample 10 may be incorporated in a manufactured electronic device 990 based on nondestructive testing of the thickness of the underlying layer 12 in the sample 10, the uniformity of underlying layer 12 thicknesses in manufactured electronic devices 990 may be improved, which may improve reliability and/or performance of the manufactured electronic devices 990.

Referring to FIGS. 2 to 4, the step S100 of irradiating the sample with the pump laser pulse to generate the acoustic wave in the sample may include generating the laser beam P by the pulsed laser 110, generating the pump laser beam P1 from the laser beam P by the beam splitter 120, reflecting the pump laser beam P1 by the first pump mirror 132, reflecting the pump laser beam P1 by the pump retroreflector 142, reflecting the pump laser beam P1 by the second pump mirror 133, passing the pump laser beam P1 through the lens 160, and injecting the pump laser beam P1 into the sample 10 such that the pump laser beam P1 is incident on incident surface 10S of the sample 10 and such that the irradiation induces generation of an acoustic wave in the sample 10, such that the acoustic wave propagates through the sample 10 over time.

The step S200 of irradiating the sample with the probe laser pulse, generating the probe laser beam P2 from the laser beam P by the beam splitter 120, reflecting the probe laser beam P2 by the probe retroreflector 141, reflecting the probe laser beam P2 by the probe mirror 131, passing the probe laser beam P2 through the lens 160, and injecting the probe laser beam P2 into the sample 10 such that the probe laser beam P2 is incident on incident surface 10S of the sample 10 subsequent to the pump laser beam P2 being incident on the incident surface 10S.

The step S300 of measuring the reflectance variation of the sample for the probe laser pulse as the function of time to obtain the graph of time versus reflectance variation may include detecting the probe laser beam P2 reflected from the sample 10 by the photo detector 170, monitoring ("detecting") variation of the reflection of the probe laser beam P2 from the sample 10 (e.g., from the incident surface 10S) over time, and obtaining the first graph G1 shown in FIG. 3 from the detected variation over time.

The step S400 of obtaining ("determining") the thickness (e.g., 12T) of the underlying layer (e.g., underlying layer 12) from the graph of time versus reflectance variation may include obtaining the thickness of the underlying layer from, (a) reflectance variations at the highest points and the lowest points of the first graph G1, (b) reflectance variations at highest points and lowest points of a second graph obtained by subtracting a saturation value from the first graph G1. (c) reflectance variations at highest points and lowest points of a third graph obtained by removing background noise from the first graph G1, and/or (d) reflectance variations at highest points and lowest points of a fourth graph obtained by normalizing the third graph so that a reflectance variation at a first lowest point of the fourth graph is 0 and a reflectance variation at a first highest point of the fourth graph is 1. Hereinafter, detailed descriptions thereof will be made with reference to FIGS. 5 to 8.

Figure 5:
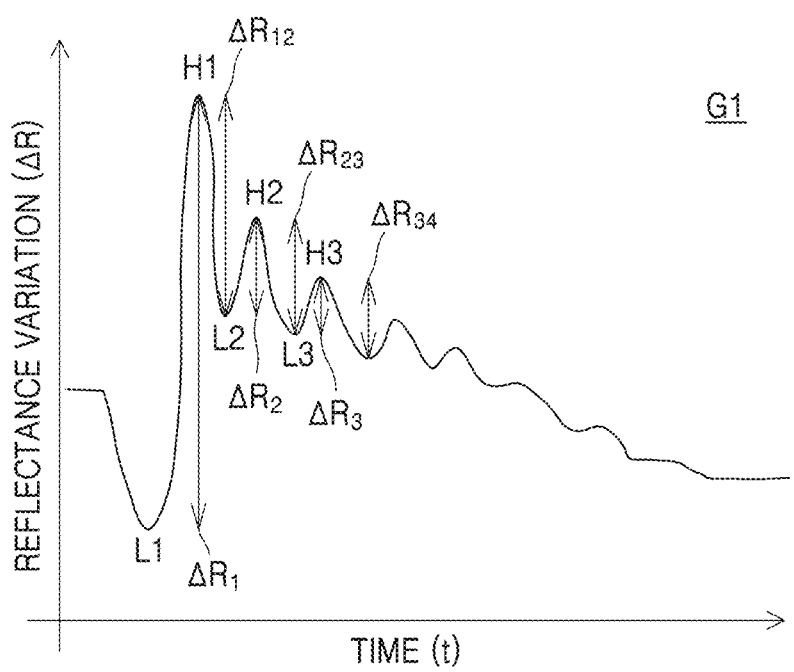
FIG. 5 is a graph illustrating a method of obtaining a thickness of an underlying layer from a graph of time versus reflectance variation obtained by a method according to some example embodiments of the inventive concepts.

FIG. 5 is a graph illustrating a method of obtaining a thickness of an underlying layer from a graph of time versus reflectance variation obtained by a method according to some example embodiments of the inventive concepts.

Referring to FIG. 5, the thickness of the underlying layer may be obtained by the reflectance variation values at the lowest points, also referred to as "troughs" (e.g., L1, L2, L3) and the highest points, also referred to as "peaks" (e.g., H1, H2, H3) of the first graph G1 may be obtained. For example, the thickness of the underlying layer may be obtained from a difference ($\Delta R(H_n)-\Delta R(L_n)$) between a magnitude of the reflectance variation at an nth highest point of the first graph G1 and a separate magnitude of the reflectance variation at an nth lowest point of the first graph G1, a difference ($\Delta R(H_n)-\Delta R(L_{n+1})$) between a magnitude of the reflectance variation at the nth highest point of the first graph G1 and a separate magnitude of the reflectance variation at an n+1th lowest point of the first graph G1, or any combination thereof. Here, n may be any natural number.

For example, when n is 2, the thickness of the underlying layer may be obtained from a difference ($\Delta R_2$) between the magnitude of the reflectance variation at the second highest point H2 of the first graph G1 and the magnitude of the reflectance variation at the second lowest point L2 of the first graph G1 and/or a difference ($\Delta R_{23}$) between the magnitude of the reflectance variation at the second highest point H2 of the first graph G1 and the magnitude of the reflectance variation at the third lowest point L3 of the first graph G1.

In some example embodiments, both of the difference ($\Delta R(H_n)-\Delta R(L_n)$) between the magnitude of the reflectance variation at the nth highest point of the first graph G1 and the magnitude of the reflectance variation at the nth lowest point of the first graph G1 and the difference ($\Delta R(H_n)-\Delta R(L_{n+1})$) between the magnitude of the reflectance variation at the nth highest point of the first graph G1 and the magnitude of the reflectance variation at the n+1th lowest point of the first graph G1 may be used to obtain ("determine") the thickness of the underlying layer of the sample. For example, a sum (i.e., ($\Delta R(H_n)-\Delta R(L_n))+(\Delta R(H_n)-\Delta R(L_{n+1}))$) of the difference ($\Delta R(H_n)-\Delta R(L_n)$) between the reflectance variation at the nth highest point of the first graph G1 and the reflectance variation at the nth lowest point of the first graph G1 and the difference ($\Delta R(H_n)-\Delta R(L_{n+1})$) between the reflectance variation at the nth highest point of the first graph G1 and the reflectance variation at the n+1th lowest point of the first graph G1 may be used to obtain the thickness of the underlying layer.

In some example embodiments, the thickness of the underlying layer may be obtained from a value from the difference between the magnitude of the reflectance variation at the nth highest point of the first graph G1 and the magnitude of the reflectance variation at the nth lowest point of the first graph G1 to the difference between the magnitude of the reflectance variation at the n+kth highest point of the first graph G1 and the magnitude of the reflectance variation at the n+kth lowest point of the first graph G1, a value from the difference between the magnitude of the reflectance variation at the nth highest point of the first graph G1 and the magnitude of the reflectance variation at the n+1th lowest point of the first graph G1 to the difference between the magnitude of the reflectance variation at the n+kth highest point of the first graph G1 and the magnitude of the reflectance variation at the n+k+1th lowest point of the first graph G1, or any combination thereof. For example, the thickness of the underlying layer may be obtained from a sum ($\Sigma_{i=0}^{i=k}\Delta R(H_{n+i})-\Delta R(L_{n+i})$) of values, from the difference between the magnitude of the reflectance variation at the nth highest point of the first graph G1 and the magnitude of the reflectance variation at the nth lowest point of the first graph G1 to the difference between the magnitude of the reflectance variation at the n+kth highest point of the first graph G1 and the magnitude of the reflectance variation at the n+kth lowest point of the first graph G1, a sum ($\Sigma_{i=0}^{i=k}\Delta R(H_{n+i})-\Delta R(L_{n+1+i})$) of values, from the difference between the magnitude of the reflectance variation at the nth highest point of the first graph G1 and the magnitude of the reflectance variation at the n+1th lowest point of the first graph G1 to the difference between the magnitude of the reflectance variation at the n+kth highest point of the first graph G1 and the magnitude of the reflectance variation at the n+k+1th lowest point of the first graph G1, or any combination thereof. Here, n and k may each be any natural number and may be a common number or different numbers.

For example, when n is 1 and k is 2, the thickness of the underlying layer may be obtained from a sum (i.e., $\Delta R_1+\Delta R_2+\Delta R_3$) of values, from the difference ($\Delta R_1$) between the reflectance variation at the first highest point H1 of the first graph G1 and the reflectance variation at the first lowest point L1 of the first graph G1 to the difference ($\Delta R_3$) between the reflectance variation at the third highest point H3 of the first graph G1 and the reflectance variation at the third lowest point L3 of the first graph G1, a sum (i.e., $\Delta R_{12}+\Delta R_{23}+\Delta R_{34}$) of values, from the difference ($\Delta R_{12}$) between the reflectance variation at the first highest point H1 of the first graph G1 and the reflectance variation at the second lowest point L2 of the first graph G1 to the difference ($\Delta R_{34}$) between the reflectance variation at the third highest point H3 of the first graph G1 and the reflectance variation at a fourth lowest point of the first graph G1, or any combination thereof.

The difference ($\Delta R(H_n)-\Delta R(L_n)$) between the reflectance variation at the nth highest point of the first graph G1 and the reflectance variation at the nth lowest point of the first graph G1, the difference ($\Delta R(H_n)-\Delta R(L_{n+1})$) between the reflectance variation at the nth highest point of the first graph G1 and the reflectance variation at the n+1th lowest point of the first graph G1, the sum ($\Sigma_{i=0}^{i=k}\Delta R(H_{n+i})-\Delta R(L_{n+i})$) of values, from the difference between the reflectance variation at the nth highest point of the first graph G1 and the reflectance variation at the nth lowest point of the first graph G1 to the difference between the reflectance variation at the n+kth highest point of the first graph G1 and the reflectance variation at the n+kth lowest point of the first graph G1, and the sum ($\Sigma_{i=0}^{i=k}\Delta R(H_{n+i})-\Delta R(L_{n+1+i})$) of values, from the difference between the reflectance variation at the nth highest point of the first graph G1 and the reflectance variation at the n+1th lowest point of the first graph G1 to the difference between the reflectance variation at the n+kth highest point of the first graph G1 and the reflectance variation at the n+k+1th lowest point of the first graph G1 may have correlation with the thickness of the underlying layer. Thus, if the correlation between these values and the thickness of the underlying layer is obtained from experiment, the thickness of the underlying layer may be measured by measuring these values. For example, the greater the thickness of the underlying layer is, the greater these values may be. There may be a linear relationship between the thickness of the underlying layer and these values.

Figure 6:
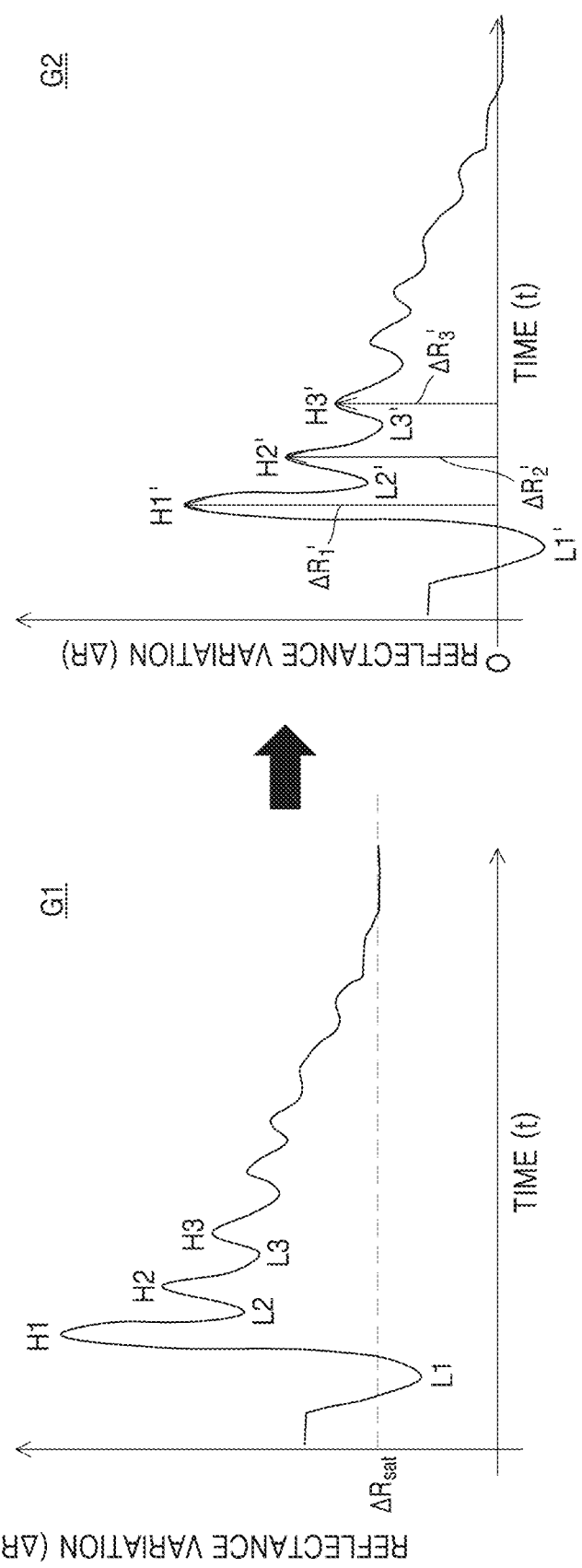
FIG. 6 is a graph illustrating a method of obtaining a thickness of an underlying layer from a graph of time versus reflectance variation obtained by a method according to some example embodiments of the inventive concepts.

FIG. 6 is a graph illustrating a method of obtaining a thickness of an underlying layer from a graph of time versus reflectance variation obtained by a method according to some example embodiments of the inventive concepts.

Referring to FIG. 6, in the first graph G1 showing time versus reflectance variation, the reflectance variation, and thus the first graph G1, may converge to a saturation value ($\Delta$Rsat) over time such that the magnitude of the reflectance variation approaches and/or is a particular saturation value as a limit of the time (t) approaches a maximum and/or infinity. A second graph G2 may be obtained by subtracting the saturation value from the first graph G1 (e.g., subtracting the saturation value from the values of the reflectance variation in the first graph G1). The graph G2 may show a reflectance variation converging to 0 over time. The thickness of the underlying layer may be obtained from the reflectance variations at highest points (e.g., H1', H2', H3') and lowest points (e.g., L1', L2', L3') of the second graph G2.

For example, the thickness of the underlying layer may be obtained from the magnitude of the reflectance variation (i.e., $\Delta R(H_n')$) at an nth highest point of the second graph G2, where n is any natural number. When n is 2, the thickness of the underlying layer may be obtained from the magnitude of the reflectance variation (i.e., $\Delta R_2'$) at a second highest point H2' of the second graph G2.

In some example embodiments, the thickness of the underlying layer may be obtained from a value ("magnitude") from the magnitude of the reflectance variation at the nth highest point of the second graph G2 to the magnitude of the reflectance variation at an n+kth highest point of the second graph G2. For example, the thickness of the underlying layer may be obtained from a sum (i.e., $\Sigma_{i=0}^{i=k} \Delta R(H_{n+i}')$) of values, from the magnitude of the reflectance variation at the nth highest point of the second graph G2 to the magnitude of the reflectance variation at the n+kth highest point of the second graph G2. Here, n and k may be any natural number. When n is 1 and k is 2, the thickness of the underlying layer may be obtained from a sum (i.e., $\Delta R_1' + \Delta R_2' + \Delta R_3'$) of values, from the magnitude of the reflectance variation ($\Delta R_1'$) at a first highest point H1' of the second graph G2 to the magnitude of the reflectance variation ($\Delta R_3'$) at a third highest point H3' of the second graph G2.

The reflectance variation ($\Delta R(H_n')$) at the nth highest point of the second graph G2, the sum (i.e., $\Sigma_{i=0}^{i=k} \Delta R(H_{n+i}')$) of values, from the reflectance variation at the nth highest point of the second graph G2 to the reflectance variation at the n+kth highest point of the second graph G2, may have correlation with the thickness of the underlying layer. Thus, if the correlation between these values and the thickness of the underlying layer is obtained from experiment, the thickness of the underlying layer may be measured by measuring these values. For example, the greater the thickness of the underlying layer is, the greater these values may be. There may be a linear relationship between the thickness of the underlying layer and these values.

Figure 7:
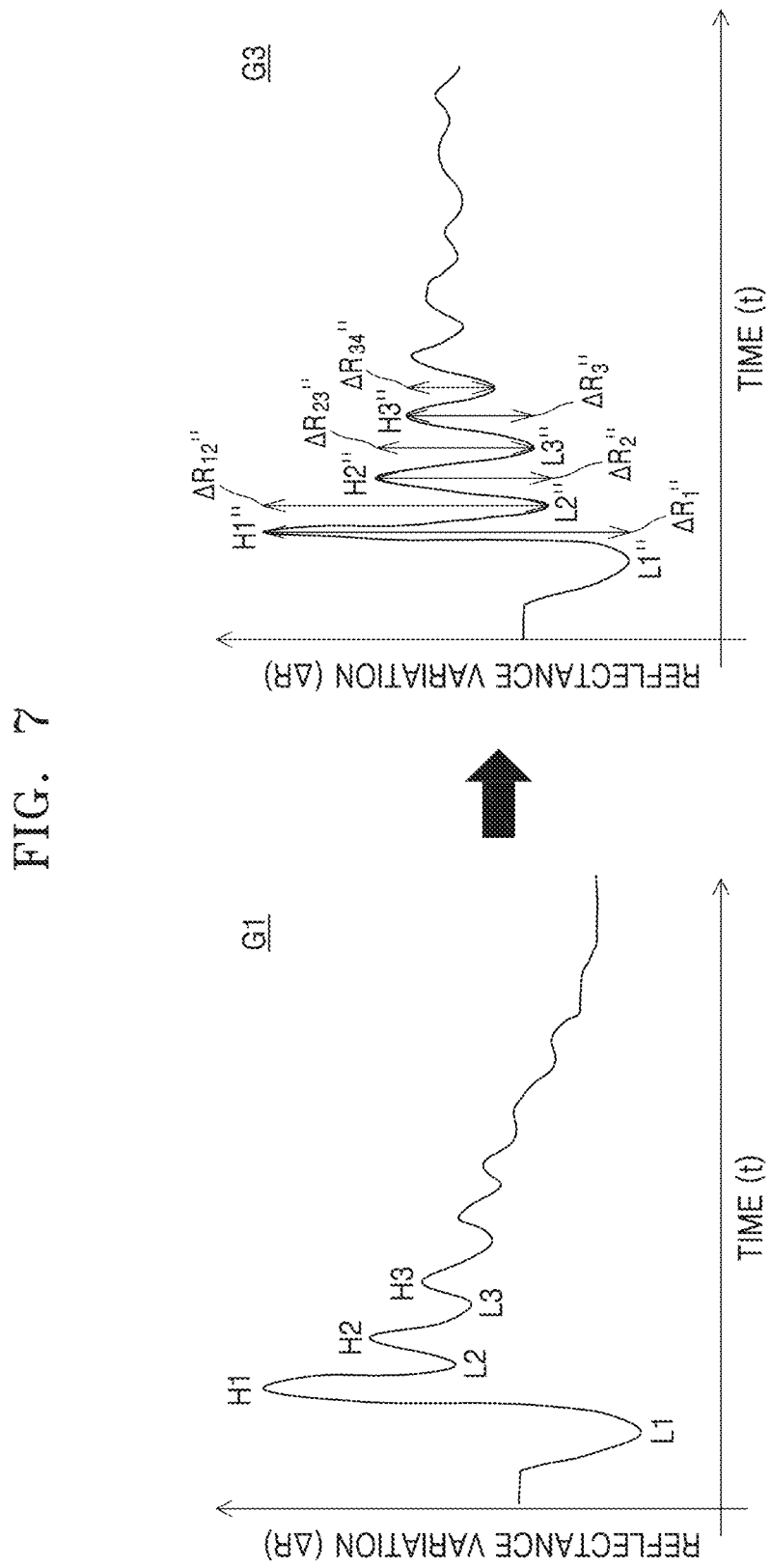
FIG. 7 is a graph illustrating a method of obtaining a thickness of an underlying layer from a graph of time versus reflectance variation obtained by a method according to some example embodiments of the inventive concepts.

FIG. 7 is a graph illustrating a method of obtaining a thickness of an underlying layer from a graph of time versus reflectance variation obtained by a method according to some example embodiments of the inventive concepts.

Referring to FIG. 7, a third graph G3 may be obtained ("generated") based on removing background noise from the first graph G1. For example, after performing polynomial fitting on at least a portion of the first graph G1, the third graph G3 may be obtained by subtracting the polynomial graph from the first graph G1. However, any expression and any graph capable of describing the background noise other than the polynomial and the polynomial graph may be used.

The thickness of the underlying layer may be obtained from magnitudes of reflectance values at lowest points (e.g., L1", L2", L3") and highest points (e.g., H1", H2", H3") of the third graph G3. For example, the thickness of the underlying layer may be obtained from a difference ($\Delta R(H_n'') - \Delta R(L_n'')$) between the magnitude of the reflectance variation at an nth highest point of the third graph G3 and the magnitude of the reflectance variation at an nth lowest point of the third graph G3, a difference ($\Delta R(H_n'') - \Delta R(L_{n+1}'')$) between the magnitude of the reflectance variation at the nth highest point of the third graph G3 and the magnitude of the reflectance variation at an n+1th lowest point of the third graph G3, or any combination thereof. Here, n may be any natural number.

When n is 2, the thickness of the underlying layer may be obtained from a difference ($\Delta R_2''$) between the magnitude of the reflectance variation at a second highest point H2" of the third graph G3 and the magnitude of the reflectance variation at a second lowest point L2" of the third graph G3 or a difference ($\Delta R_{23}''$) between the magnitude of the reflectance variation at the second highest point H2" of the third graph G3 and the magnitude of the reflectance variation at a third lowest point L3" of the third graph G3.

In some example embodiments, the thickness of the underlying layer may be obtained from both of the difference ($\Delta R(H_n'') - \Delta R(L_n'')$) between the magnitude of the reflectance variation at the nth highest point of the third graph G3 and the magnitude of the reflectance variation at the nth lowest point of the third graph G3 and the difference ($\Delta R(H_n'') - \Delta R(L_{n+1}'')$) between the magnitude of the reflectance variation at the nth highest point of the third graph G3 and the magnitude of the reflectance variation at the n+1th lowest point of the third graph G3. For example, a sum (i.e., ($\Delta R(H_n'') - \Delta R(L_n'')) + (\Delta R(H_n'') - \Delta R(L_{n+1}''))$) of the difference ($\Delta R(H_n'') - \Delta R(L_n'')$) between the reflectance variation at the nth highest point of the third graph G3 and the reflectance variation at the nth lowest point of the third graph G3 and the difference ($\Delta R(H_n'') - \Delta R(L_{n+1}'')$) between the reflectance variation at the nth highest point of the third graph G3 and the reflectance variation at the n+1th lowest point of the third graph G3 may be used to obtain the thickness of the underlying layer.

In some example embodiments, the thickness of the underlying layer may be obtained from a sum of values, from the difference between the magnitude of the reflectance variation at the nth highest point of the third graph G3 and the magnitude of the reflectance variation at the nth lowest point of the third graph G3 to a difference between the magnitude of the reflectance variation at an n+kth highest point of the third graph G3 and the magnitude of the reflectance variation at an n+kth lowest point of the third graph G3, a sum of values, from the difference between the magnitude of the reflectance variation at the nth highest point of the third graph G3 and the magnitude of the reflectance variation at the n+1th lowest point of the third graph G3 to a difference between the magnitude of the reflectance variation at the n+kth highest point of the third graph G3 and the magnitude of the reflectance variation at an n+k+1th lowest point of the third graph G3, or any combination thereof. For example, the thickness of the underlying layer may be obtained from a sum ($\Sigma_{i=0}^{i=k} \Delta R(H_{n+i}'') - \Delta R(L_{n+i}'')$) of values, from the difference between the magnitude of the reflectance variation at the nth highest point of the third graph G3 and the magnitude of the reflectance variation at the nth lowest point of the third graph G3 to the difference between the magnitude of the reflectance variation at the n+kth highest point of the third graph G3 and the magnitude of the reflectance variation at the n+kth lowest point of the third graph G3, a sum ($\Sigma_{i=0}^{i=k} \Delta R(H_{n+i}'') - \Delta R(L_{n+1+i}'')$) of values, from the difference between the magnitude of the reflectance variation at the nth highest point of the third graph G3 and the magnitude of the reflectance variation at the n+1th lowest point of the third graph G3 to the difference between the magnitude of the reflectance variation at the n+kth highest point of the third graph G3 and the magnitude of the reflectance variation at the n+k+1th lowest point of the third graph G3, or any combination thereof. Here, n and k may be any natural number.

For example, when n is 1 and k is 2, a sum (i.e., $\Delta R_1''+\Delta R_2''+\Delta R_3''$) of values, from a difference ($\Delta R_1''$) between the magnitude of the reflectance variation at a first highest point H1" of the third graph G3 and the magnitude of the reflectance variation at a first lowest point L1" of the third graph G3 and a difference (($\Delta R_3''$) between the magnitude of the reflectance variation at a third highest point H3" of the third graph G3 and the magnitude of the reflectance variation at the third lowest point L3" of the third graph G3 and a sum (i.e., $\Delta R_{12}''+\Delta R_{23}''+\Delta R_{34}''$) of values from a difference ($\Delta R_{12}''$) between the magnitude of the reflectance variation at the first highest point H1" of the third graph G3 and the magnitude of the reflectance variation at the second lowest point L2" of the third graph G3 to a difference (($\Delta R_{34}''$) between the magnitude of the reflectance variation at the third highest point H3" of the third graph G3 and the magnitude of the reflectance variation at a fourth lowest point of the third graph G3.

The difference ($\Delta R(H_n'')-\Delta R(L_n'')$) between the magnitude of the reflectance variation at the nth highest point of the third graph G3 and the magnitude of the reflectance variation at the nth lowest point of the third graph G3, the difference ($\Delta R(H_n'')-\Delta R(_{Ln+1}'')$) between the magnitude of the reflectance variation at the nth highest point of the third graph G3 and the magnitude of the reflectance variation at an n+1th lowest point of the third graph G3, the sum ($\Sigma_{i=0}^{i=k}\Delta R(H_{n+i}'')-\Delta R(L_{n+i}'')$) of values, from the difference between the magnitude of the reflectance variation at the nth highest point of the third graph G3 and the magnitude of the reflectance variation at the nth lowest point of the third graph G3 to the difference between the magnitude of the reflectance variation at the n+kth highest point of the third graph G3 and the magnitude of the reflectance variation at the n+kth lowest point of the third graph G3, and the sum ($\Sigma_{i=0}^{i=k}\Delta R(H_{n+i}'')-\Delta R(L_{n+1+i}'')$) of values, from the difference between the magnitude of the reflectance variation at the nth highest point of the third graph G3 and the magnitude of the reflectance variation at the n+1th lowest point of the third graph G3 to the difference between the magnitude of the reflectance variation at the n+kth highest point of the third graph G3 and the magnitude of the reflectance variation at the n+k+1th lowest point of the third graph G3 may have correlation with the thickness of the underlying layer. Thus, if the correlation between these values and the thickness of the underlying layer is obtained from experiment, the thickness of the underlying layer may be measured by measuring these values. For example, the greater the thickness of the underlying layer is, the greater these values may be. There may be a linear relationship between the thickness of the underlying layer and these values.

Figure 8:
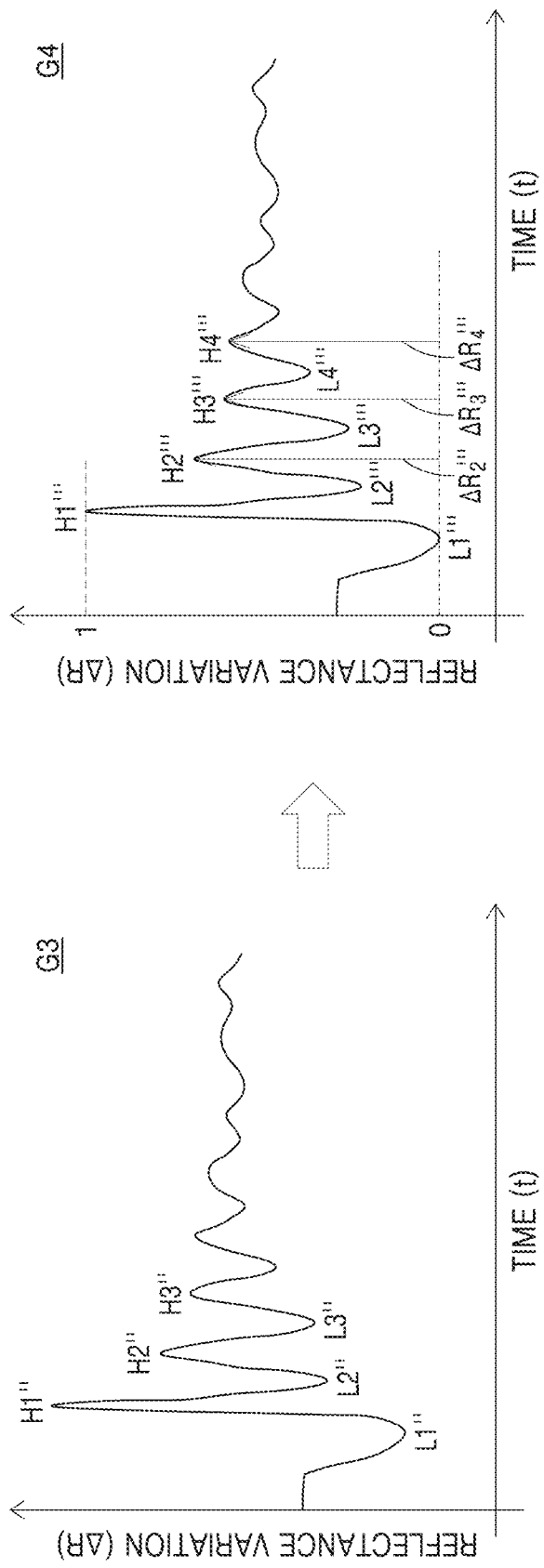
FIG. 8 is a graph illustrating a method of obtaining a thickness of an underlying layer from a graph of time versus reflectance variation obtained by a method according to some example embodiments of the inventive concepts.

FIG. 8 is a graph illustrating a method of obtaining a thickness of an underlying layer from a graph of time versus reflectance variation obtained by a method according to some example embodiments of the inventive concepts.

Referring to FIG. 8, a fourth graph G4 may be obtained ("generated") based on normalizing the third graph G3 so that a magnitude of the first lowest point L1''' of the fourth graph G4 is 0 and a magnitude of the highest point H1''' of the fourth graph G4 is 1. The third graph G3 may be obtained by removing the background noise from the first graph G1, as described with reference to FIG. 7. The thickness of the underlying layer may be obtained from reflectance variation values at lowest points (e.g., L1''', L2''', L3''') and highest points (e.g., H1''', H2''', H3''') of the fourth graph G4.

For example, the thickness of the underlying layer may be obtained from the magnitude of the reflectance variation (i.e., $\Delta R(H_{n+1}''')$) at an n+1th highest point of the fourth graph G4, where n is any natural number. For example, when n is 2, the thickness of the underlying layer may be obtained from the magnitude of the reflectance variation ($\Delta R3'''$) at a third highest point H3''' of the fourth graph G4.

In some example embodiments, the thickness of the underlying layer may be obtained from a value from the magnitude of the reflectance variation at the n+1th highest point of the fourth graph G4 to the magnitude of the reflectance variation at an n+k+1th highest point of the fourth graph G4. For example, the thickness of the underlying layer may be obtained from a sum (i.e., $\Sigma_{i=0}^{i=k}\Delta R(H_{n+1+i})$) of values, from the magnitude of the reflectance variation at the n+1th highest point of the fourth graph G4 to the magnitude of the reflectance variation at an n+k+1th highest point of the fourth graph G4. Here, n and k may each be any natural number.

For example, when n is 1 and k is 2, the thickness of the underlying layer may be obtained from a sum (i.e., $\Delta R2'''+\Delta R3'''+\Delta R4'''$) of values, from the magnitude of the reflectance variation ($\Delta R2'''$) at a second highest point H2''' of the fourth graph G4 to the magnitude of the reflectance variation ($\Delta R4'''$) at a fourth highest point H4''' of the fourth graph G4.

The magnitude of the reflectance variation ($\Delta R(Hn+1''')$) at the n+1th highest point of the fourth graph G4 and the sum (i.e., $\Sigma_{i=0}^{i=k}\Delta R(H_{n+1+i}''')$) of values, from the magnitude of the reflectance variation at the n+1th highest point of the fourth graph G4 to the magnitude of the reflectance variation at an n+k+1th highest point of the fourth graph G4 may have correlation with the thickness of the underlying layer. Thus, if the correlation between these values and the thickness of the underlying layer is obtained from experiment, the thickness of the underlying layer may be measured by measuring these values. For example, the greater the thickness of the underlying layer is, the greater these values may be. There may be a linear relationship between the thickness of the underlying layer and these values.

Figure 9:
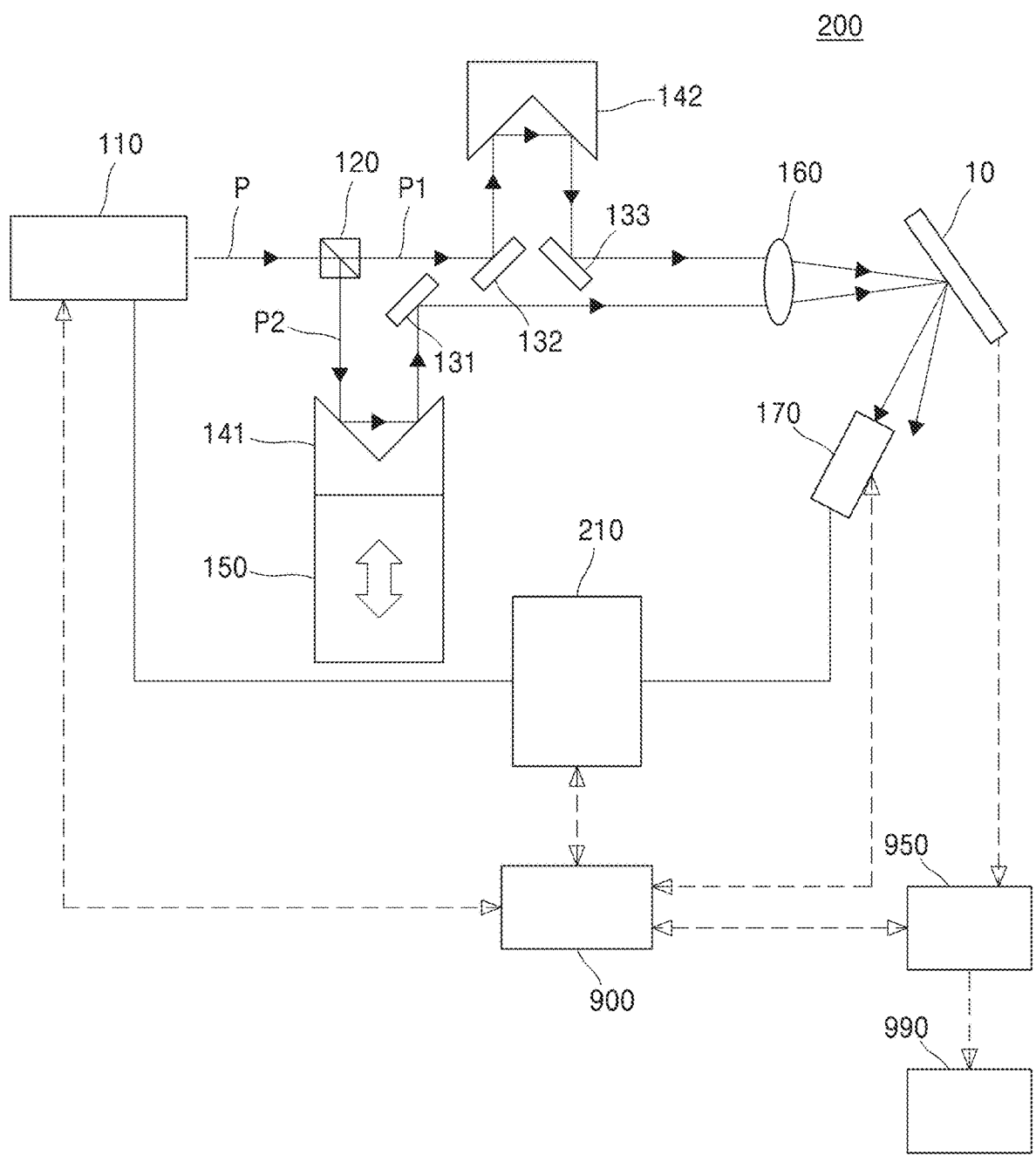
FIG. 9 is a schematic view of a measurement apparatus used for a method according to some example embodiments of the inventive concepts.

FIG. 9 is a schematic view of a measurement apparatus used for a method according to some example embodiments of the inventive concepts. Hereinafter, the differences between the measurement apparatus 100 shown in FIG. 2 and a measurement apparatus 200 shown in FIG. 9 are described.

Referring to FIG. 9, the measurement apparatus 200 may further include a noise feedback device 210 connected to the photo detector 170 and the pulsed laser 110. The measurement apparatus 200 may further include a computing device 900 and manufacturing assembly 950, where the computing device 900 may be further communicatively coupled to the noise feedback device 210. The noise feedback device 210 may control the pulsed laser 110 based on the graph of time versus reflectance variation recorded from the photo detector 170 to adjust the magnitude of noise and thus may control the laser beam P1 and the probe laser beam P2.

Figure 10:
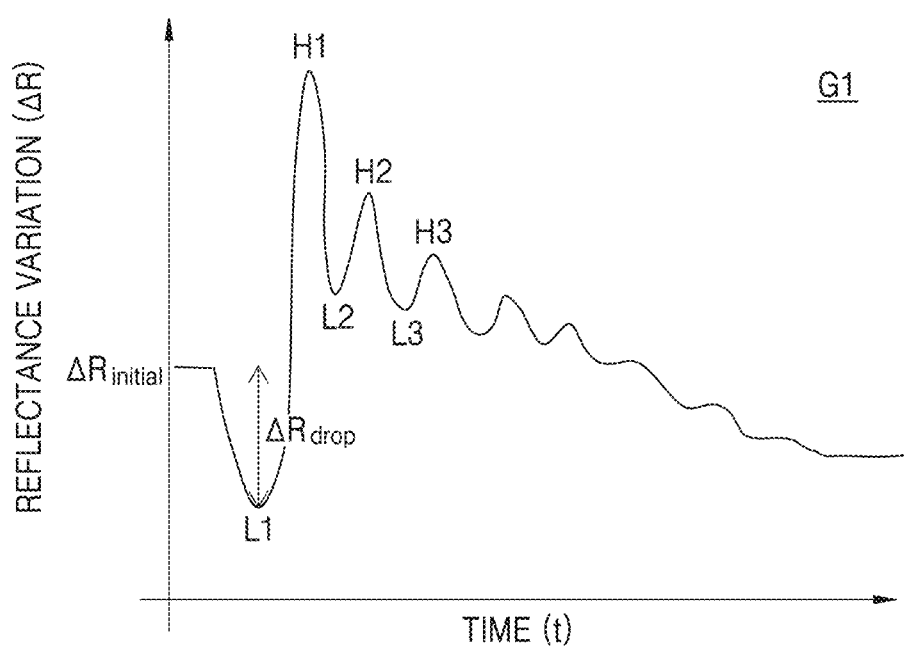
FIG. 10 is a graph of time versus reflectance variation recorded using the measuring apparatus of FIG. 9.

FIG. 10 is a graph of time versus reflectance variation recorded using the measuring apparatus of FIG. 9.

Referring to FIG. 10, in the first graph G1 recorded using the measurement apparatus 200 shown in FIG. 9, a difference (i.e., $\Delta R_{drop}$) between an initial magnitude of the reflectance variation ($\Delta R$initial, also referred to a magnitude of the reflectance variation at a starting point (e.g., t=0) of the first graph G1) and the magnitude of the reflectance variation at the first lowest point L1 may be constant regardless of the thickness of the underlying layer. $\Delta R_{drop}$ may be a value related to electrical noise. The amount of electrical noise included in each measurement may be the same by maintaining $\Delta R_{drop}$ constant regardless of the thickness of the underlying layer. Thus, the electrical noise may hardly affect the measurement result.

Figure 11:
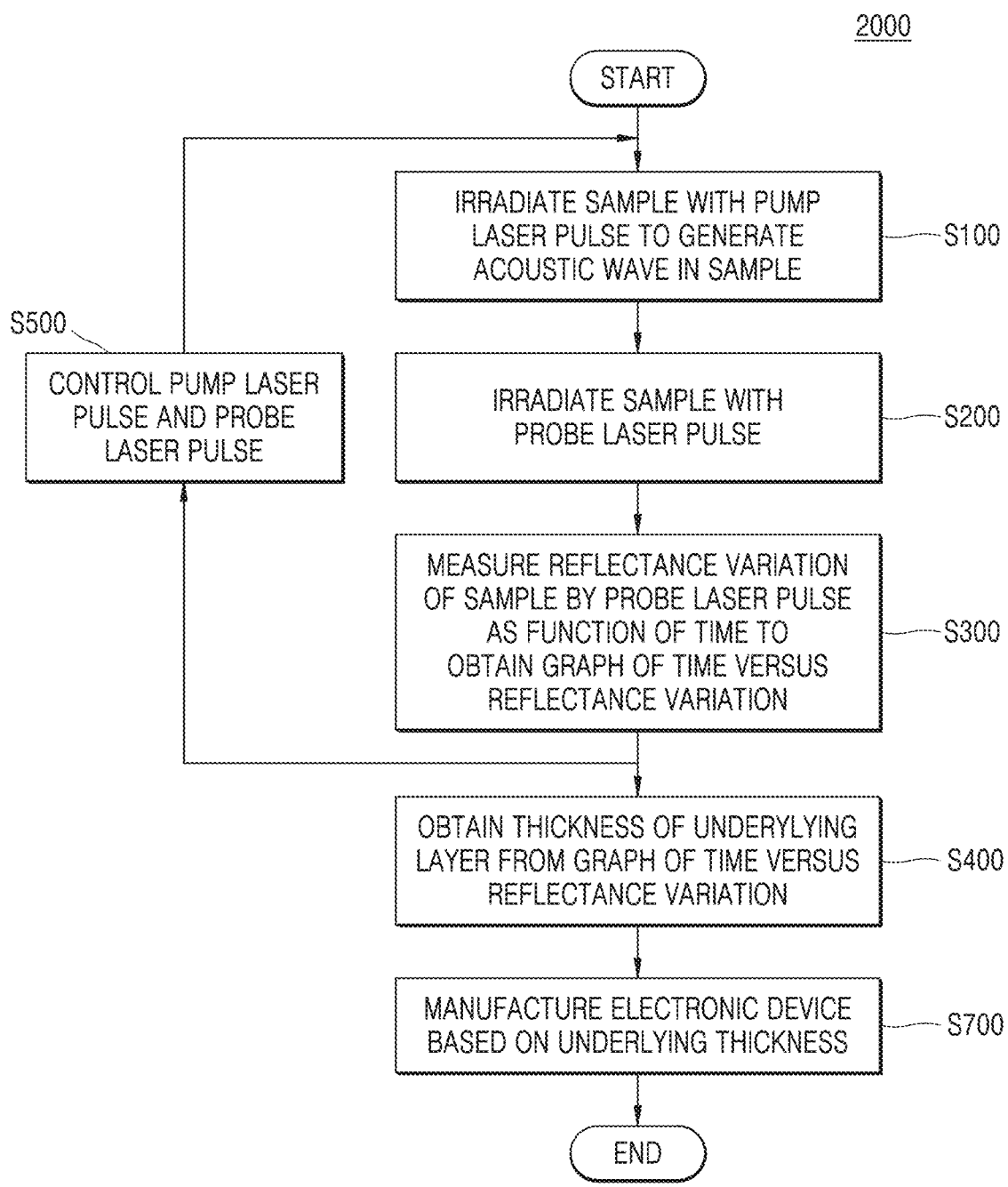
FIG. 11 is a flow chart of a method according to some example embodiments of the inventive concepts.

FIG. 11 is a flow chart of a method according to some example embodiments of the inventive concepts. The method 2000 may be performed, partially or entirely, by the computing device 900. The differences between the method 1000 shown in FIG. 4 and a method 2000 shown in FIG. 11 are described.

Referring to FIG. 11, the method 2000 may include a step S500 of controlling the pump laser pulse and the probe laser pulse based on the graph of time versus reflectance variation. For example, the method 2000 may include the step S100 of irradiating the sample (e.g., irradiating an incident surface of the sample) with the pump laser pulse to generate ("induce generation of") the acoustic wave in the sample such that the acoustic wave propagates through the sample over time, the step S200 of irradiating the sample (e.g., irradiating the incident surface of the sample) with the probe laser pulse subsequent to irradiating the sample with the pump laser pulse, the step S300 of measuring ("determining") the reflectance variation of the sample for the probe laser pulse as the function of time (e.g., a variation of reflectance of the sample over time, as indicated by variation of reflection of the probe laser pulse from the incident surface of the sample over time) during propagation of the acoustic wave in the sample to obtain an initial graph (e.g., as shown in FIG. 3) in which the reflectance variation of the sample as the function of time is recorded, the step S500 of controlling the pump laser pulse and the probe laser pulse based on the initial graph (e.g., as shown in FIG. 3), the step S100 of irradiating the sample with the controlled pump laser pulse based on the controlling to generate the acoustic wave in the sample, the step S200 of irradiating the sample with the controlled probe laser pulse based on the controlling, the step S300 of determining the reflectance variation of the sample for the controlled probe laser pulse as the function of time during the propagation of the acoustic wave in the sample to obtain a final graph (e.g., as shown in FIG. 10) showing the reflectance variation as the function of time, and the step S400 of obtaining ("determining") the thickness of the underlying layer of the sample (e.g., layer 12 of sample 10) from the final graph (e.g., as shown in FIG. 10). The step S500 of controlling the pump laser pulse and the probe laser pulse based on the initial graph may include controlling the pump laser pulse and the probe laser pulse based on a difference between the magnitude of the reflectance variation at a starting point of the initial graph and the magnitude of the reflectance variation at the first lowest point of the initial graph. By the step S500 of controlling the pump laser pulse and the probe laser pulse, the difference ($\Delta Rdrop$) between the magnitude of the reflectance variation at a starting point of the final graph (e.g., as shown in FIG. 10) and the magnitude of the reflectance variation at a first lowest point of the final graph (e.g., as shown in FIG. 10) may be a constant value regardless of the thickness of the underlying layer. The method 2000 may be performed using the measurement apparatus 200 shown in FIG. 9.

Figure 12:
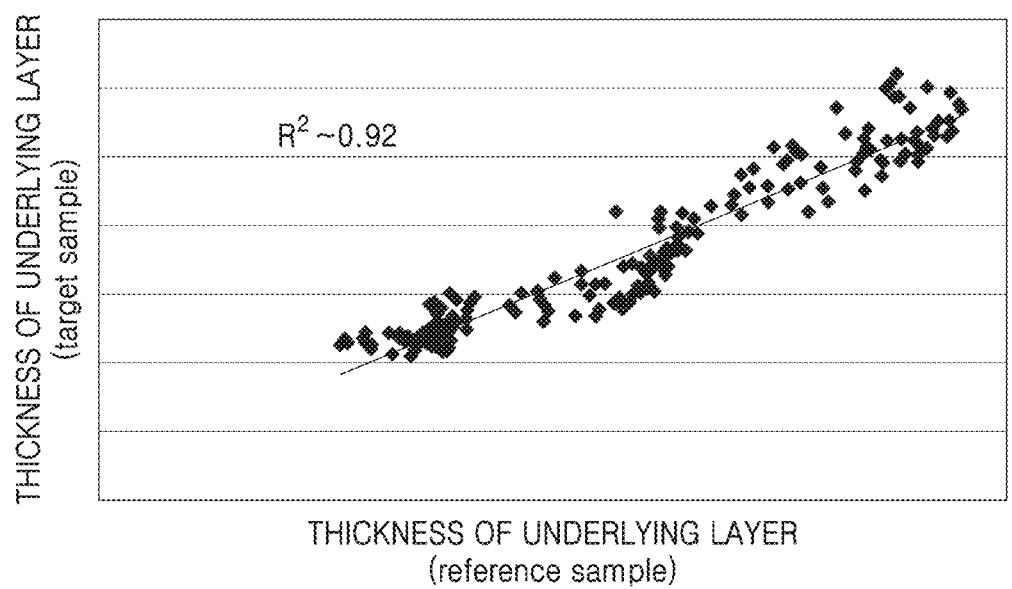
FIG. 12 is a graph showing a correlation between a thickness of an underlying layer measured according to some example embodiments of the inventive concepts and a thickness of the underlying layer measured using X-ray fluorescence (XRF).

FIG. 12 is a graph showing a correlation between a thickness of an underlying layer measured according to some example embodiments of the inventive concepts and a thickness of the underlying layer measured using X-ray fluorescence (XRF).

Referring to FIG. 12, reference samples including only a substrate and underlying layers with various thicknesses on the substrate were prepared, or target samples including a substrate and underlying layers with the various thicknesses on the substrate, and an overlying layer with a constant thickness on the underlying layers were prepared. The substrate of the reference samples and the substrate of the target samples include the same material. The underlying layer of each of the reference samples and the underlying layer of each of the target samples corresponding to respective ones of the reference samples include the same material and have the same thickness.

The thicknesses of the underlying layers of the reference samples were measured using X-ray fluorescence (XRF). The thicknesses of the underlying layers of the reference samples were measured by the method 1000 according to some example embodiments shown in FIG. 4. To obtain thickness of the underlying layer of each of the target samples from the graph of time versus reflectance variation, from the fourth graph G4 obtained by normalizing the third graph G3 obtained by removing the background noise from the first graph G1, as shown in FIG. 8, the sum ($\Delta R_2''' + \Delta R_3''' + \Delta R_4'''$) of values, from the reflectance variation at the second highest point H2''' of the fourth graph G4 to the reflectance variation at the fourth highest point H4''' of the fourth graph G4 was calculated.

It was confirmed that the thicknesses of the underlying layers measured by XRF were in a linear relationship with the thicknesses of the underlying layers measured by the method 1000 (refer to FIG. 10) according to some example embodiments of the inventive concepts. $R^2$ value for a linear regression equation appeared to be 0.92. Thus, it was confirmed that the method for nondestructive measurement of the thickness of the underlying layer according to some example embodiments of the inventive concepts was valid.

While the present inventive concepts have been particularly shown and described with reference to example embodiments thereof, it will be understood by those of ordinary skill in the art that various changes in form and details may be made therein without departing from the spirit and scope of the present disclosure as defined by the following claims.

What is claimed is:

1. A method, the method comprising:
    irradiating a sample with a pump laser pulse to induce generation of an acoustic wave in the sample such that the acoustic wave propagates through the sample over time, the sample including a substrate, an underlying layer on the substrate, and an overlying layer on the underlying layer,
    irradiating the sample with a probe laser pulse subsequent to irradiating the sample with the pump laser pulse;
    determining a reflectance variation of the sample over time, based on monitoring a variation of a reflection of the probe laser pulse from the sample over time, to generate a first graph showing a variation of reflectance of the sample over time; and
    determining a thickness of the underlying layer based on the first graph,
    wherein the determining the thickness based on the first graph includes
        determining the thickness based on magnitudes of the reflectance variation at highest points and lowest points of the first graph,
        determining the thickness based on magnitudes of the reflectance variation at highest points and lowest points of a second graph, the second graph generated based on subtracting a saturation value from magnitudes of the reflectance variation in the first graph, determining the thickness based on magnitudes of the reflectance variation at highest points and lowest points of a third graph, the third graph generated based on subtracting a background noise from magnitudes of the reflectance variation in the first graph, or determining the thickness based on magnitudes of the reflectance variation at highest points and lowest points of a fourth graph, the fourth graph generated based on normalizing the third graph so that a magnitude of the reflectance variation at a first lowest point of the fourth is 0 and a magnitude of the reflectance variation at a first highest point of the fourth graph is 1.

2. The method of claim 1, wherein
the determining the thickness includes
determining the thickness based on a difference between a magnitude of the reflectance variation at an nth highest point of the first graph and a magnitude of the reflectance variation at an nth lowest point of the first graph, determining the thickness based on a difference between the magnitude of the reflectance variation at the nth highest point of the first graph and a magnitude of the reflectance variation at an n+1th lowest point of the first graph, or any combination thereof, and n is a natural number.

3. The method of claim 1, wherein
the determining the thickness includes
determining the thickness based on a sum of (k+1) values, from a difference between a magnitude of the reflectance variation at an nth highest point of the first graph and a magnitude of the reflectance variation at an nth lowest point of the first graph to a difference between a magnitude of the reflectance variation at an n+kth highest point of the first graph and a magnitude of the reflectance variation at an n+kth lowest point of the first graph, determining the thickness based on a sum of (k+1) values, from a difference between the magnitude of the reflectance variation at the nth highest point of the first graph and a magnitude of the reflectance variation at an n+1th lowest point of the first graph to a difference between the magnitude of the reflectance variation at the n+kth highest point of the first graph and a magnitude of the reflectance variation at an n+k+1th lowest point of the first graph, or any combination thereof, and each value of n and k is a natural number.

4. The method of claim 1, wherein
the first graph converges to the saturation value over time.

5. The method of claim 4, wherein
the determining the thickness based on the magnitude of the reflectance variation at highest points and lowest points of the second graph is based on a magnitude of the reflectance variation at an nth highest point of the second graph, and n is a natural number.

6. The method of claim 4, wherein
the determining the thickness based on the magnitudes of the reflectance variation at highest points aid lowest points of the second graph includes determining the thickness based on a sum of (k+1) values, from a magnitude of the reflectance variation at an nth highest point of the second graph to a magnitude of the reflectance variation at an n+kth highest point of the second graph, and each value of n and k is a natural number.

7. The method of claim 1, wherein the determining the thickness based on the magnitude of the reflectance variation at highest points and lowest points of the third graph includes determining the thickness based on a difference between a magnitude of the reflectance variation at an nth highest point of the third graph and a magnitude of the reflectance variation at an nth lowest point of the third graph, determining the thickness based on a difference between the magnitude of the reflectance variation at the nth highest point of the third graph and a magnitude of the reflectance variation at an n+1th lowest point of the third graph, or any combination thereof, and n is a natural number.

8. The method of claim 1, wherein the determining the thickness based on the magnitudes of the reflectance variation at highest points and lowest points of the third graph includes
determining the thickness based on a sum of (k+1) values, from a difference between a magnitude of the reflectance variation at an nth highest point of the third graph and a magnitude of the reflectance variation at an nth lowest point of the third graph to a difference between a magnitude of the reflectance variation at an n+kth highest point of the third graph and a magnitude of the reflectance variation at an n+kth lowest point of the third graph, determining the thickness based on a sum of (k+1) values, from a difference between the magnitude of the reflectance variation at the nth highest point of the third graph and a magnitude of the reflectance variation at an n+1th lowest point of the third graph to a difference between the magnitude of the reflectance variation at the n+kth highest point of the third graph and a magnitude of the reflectance variation at an n+k+1th lowest point of the third graph, or any combination thereof, and wherein each value of n and k is a natural number.

9. The method of claim 1, wherein
the determining the thickness based on the magnitudes of the reflectance variation at highest points and lowest points of the fourth graph is based on a magnitude of the reflectance variation at an n+1th highest point of the fourth graph, and n is a natural number.

10. The method of claim 1, wherein
the determining the thickness based on the magnitudes of the reflectance variation at highest points and lowest points of the fourth graph is based on a sum of (k+1) values, from a magnitude of the reflectance variation an n+1th highest point of the fourth graph to a magnitude of the reflectance variation at an n+k+1th highest point of the fourth graph, and each value of n and k is a natural number.

11. The method of claim 1, wherein a difference between a magnitude of the reflectance variation at a starting point of the first graph and a magnitude of the reflectance variation at a first lowest point of the first graph is constant regardless of the thickness of the underlying layer.

12. A method, the method comprising:
irradiating a sample with a pump laser pulse to induce generation of an acoustic wave in the sample such that the acoustic wave propagates through the sample over time, the sample including a substrate, an underlying layer on the substrate, an overlying layer on the underlying layer;

irradiating the sample with a probe laser pulse subsequent to irradiating the sample with the pump laser pulse;

determining an initial reflectance variation of the sample over time, based on monitoring a variation of a reflection of the probe laser pulse from the sample over time, to generate an initial graph showing an initial variation of reflectance of the sample over time;

controlling the pump laser pulse and the probe laser pulse based on the initial graph to
- irradiate the sample with the controlled pump laser pulse, and
- irradiate the sample with the controlled probe laser pulse;

determining a final reflectance variation of the sample over time, based on monitoring a variation of a reflection of the controlled probe laser pulse from the sample over time, to generate a final graph showing a final variation of reflectance of the sample over time based on the controlling; and determining a thickness of the underlying layer based on the final graph.

13. The method of claim 12, wherein the controlling the pump laser pulse and the probe laser pulse based on the initial graph includes controlling the pump laser pulse and the probe laser pulse based on a difference between a magnitude of the initial reflectance variation at a starting point of the initial graph and a magnitude of the initial reflectance variation at a first lowest point of the initial graph.

14. The method of claim 13, wherein the difference between the magnitude of the final reflectance variation at the starting point of the final graph and the magnitude of the final reflectance variation at the first lowest point of the final graph is constant regardless of the thickness of the underlying layer.

15. A method, the method comprising:

generating an acoustic wave in a sample including a substrate, an underlying layer on the substrate, and an overlying layer on the underlying layer;

generating a first graph showing a reflectance variation of the sample as a function of time during propagation of the acoustic wave in the sample; and determining a thickness of the underlying layer based on the first graph, wherein the determining the thickness based on the first graph includes
- determining the thickness based on magnitudes of the reflectance variation at highest points and lowest points of the first graph,
- determining the thickness based on magnitudes of the reflectance variation at highest points and lowest points of a second graph, the second graph generated based on subtracting a saturation value from magnitudes of the reflectance variation in the first graph, determining the thickness based on magnitudes of the reflectance variation at highest points and lowest points of a third graph, the third graph generated based on subtracting a background noise from magnitudes of the reflectance variation in the first graph, or determining the thickness based on magnitudes of the reflectance variation at highest points and lowest points of a fourth graph, the fourth graph generated based on normalizing the third graph so that a magnitude of the reflectance variation at a first lowest point of the fourth graph is 0 and a magnitude of the reflectance variation at a first highest point of the fourth graph is 1.

16. The method of claim 15, wherein the generating the acoustic wave in the sample includes irradiating the sample with a pump laser pulse.

17. The method of claim 15, wherein the generating the first graph includes irradiating the sample with a probe laser pulse; and
- detecting a reflection of the probe laser pulse from the sample.

* * * * *